(12) United States Patent
Lugosch

(10) Patent No.: US 12,038,231 B2
(45) Date of Patent: Jul. 16, 2024

(54) SYSTEMS AND RELATED METHODS FOR SEPARATING NITROGEN FROM A NATURAL GAS STREAM CONTAINING LESS THAN 25% NITROGEN

(71) Applicant: AZOTA GAS PROCESSING, LTD., Houston, TX (US)

(72) Inventor: Pierre E. Lugosch, Houston, TX (US)

(73) Assignee: Azota Gas Processing, Ltd., Houston, TX (US)

( * ) Notice: Subject to any disclaimer, the term of this patent is extended or adjusted under 35 U.S.C. 154(b) by 221 days.

(21) Appl. No.: 17/188,729

(22) Filed: Mar. 1, 2021

(65) Prior Publication Data
US 2021/0270524 A1    Sep. 2, 2021

Related U.S. Application Data

(60) Provisional application No. 62/983,442, filed on Feb. 28, 2020.

(51) Int. Cl.
*F25J 3/06* (2006.01)
*F25J 1/00* (2006.01)
*F25J 1/02* (2006.01)

(52) U.S. Cl.
CPC ............. *F25J 3/066* (2013.01); *F25J 1/0015* (2013.01); *F25J 1/0279* (2013.01); *F25J 3/0695* (2013.01); *F25J 2200/74* (2013.01); *F25J 2210/60* (2013.01); *F25J 2215/42* (2013.01)

(58) Field of Classification Search
CPC   F25J 3/0257; F25J 3/066; F25J 1/0015; F25J 1/0279; F25J 3/0695; F25J 2200/74; F25J 2210/60; F25J 2215/42; F25J 3/0233; F25J 3/0209; F25J 2200/04; F25J 2200/06; F25J 2200/08; F25J 2200/38; F25J 2200/40; F25J 2200/72; F25J 2200/76; F25J 2200/78; F25J 2230/30; F25J 2230/32; F25J 2235/60; F25J 2270/02; Y02C 20/40
See application file for complete search history.

(56) References Cited

U.S. PATENT DOCUMENTS

| | | | |
|---|---|---|---|
| 2009/0113930 A1* | 5/2009 | Patel | F25J 3/0233 62/618 |
| 2016/0054054 A1* | 2/2016 | Johnson | F25J 3/0233 62/622 |
| 2018/0231306 A1* | 8/2018 | Butts | F25J 5/007 |

* cited by examiner

*Primary Examiner* — Miguel A Diaz
*Assistant Examiner* — Ibrahim A. Michael Adeniji
(74) *Attorney, Agent, or Firm* — Crowe & Dunlevy, P.C.

(57) ABSTRACT

A method for separating nitrogen from an inlet gas having less than 25 mole % nitrogen includes supplying the inlet gas having less than 25 mole % nitrogen to a nitrogen separation system configured with cryogenic refrigeration.

6 Claims, 3 Drawing Sheets

SYSTEMS AND RELATED METHODS FOR SEPARATING NITROGEN FROM A NATURAL GAS STREAM CONTAINING LESS THAN 25% NITROGEN

CROSS REFERENCE TO RELATED APPLICATION

This application claims the benefit of Provisional Patent Application No. 62/983,442 filed on Feb. 28, 2020, which is incorporated by reference herein in its entirety.

TECHNICAL FIELD

This disclosure relates to separation of nitrogen from a natural gas stream.

BACKGROUND

Pipelines often require a natural gas stream to have a total inert gas composition including nitrogen of 2% or less. Often, a natural gas stream has a nitrogen content higher than 2%. Therefore, nitrogen is separated from natural gas streams before sales to the pipelines. These gas streams are often processed to remove heavier hydrocarbon components in a low temperature gas liquids recovery plant. The gas stream leaving these plants may have the ethane and heavier components largely removed, but the nitrogen in the original inlet gas stream remains.

A number of conventional separation processes may be used to remove nitrogen in a liquids recovery plant when the nitrogen in the inlet gas is present in a large amount, e.g., 25% or more. Conventional techniques for separating nitrogen from a natural gas stream become less effective when the nitrogen content is below 25%. The present disclosure addresses the need to separate nitrogen from a natural gas when nitrogen when the nitrogen content is below 25%.

SUMMARY

In aspects, the present disclosure provides a method for separating nitrogen from an inlet gas having less than 25 mole % nitrogen. The method may include supplying the inlet gas having less than 25 mole % nitrogen to a nitrogen separation system configured with cryogenic refrigeration.

In further aspects, the present disclosure provides a method for separating nitrogen from an inlet gas from an NGL recovery plant. The inlet gas stream may have less than 25 mole % nitrogen. The method may include the steps of at least partially condensing the inlet gas stream to form an at least partially condensed inlet stream; processing the at least partially condensed inlet stream in a distillation tower to form an overhead gas stream and a liquid bottoms stream; dividing the overhead gas stream into a first portion and a second portion; heating the first portion using at least the inlet gas; compressing the heated first portion to a pressure at least 100 PSI higher than an operating pressure of the distillation tower; at least partially condensing the compressed heated first portion to form reflux stream; feeding the reflux stream to the distillation tower; feeding the second portion to a nitrogen rejection unit, the nitrogen rejection unit producing a cold nitrogen rich stream and at least one cold methane rich stream; heating the cold nitrogen rich stream using at least the inlet gas stream to an ambient temperature; and heating the at least one cold methane stream using at least the inlet gas stream to an ambient temperature.

The above-recited example of features of the disclosure have been summarized rather broadly in order that the detailed description thereof that follows may be better understood, and in order that the contributions to the art may be appreciated. There are, of course, additional features of the disclosure that will be described hereinafter and which will form the subject of the claims appended hereto.

BRIEF DESCRIPTION OF THE DRAWING

For detailed understanding of the present disclosure, references should be made to the following detailed description of the disclosure, taken in conjunction with the accompanying drawings, in which like elements have been given like numerals and wherein.

DETAILED DESCRIPTION

Figure 1:
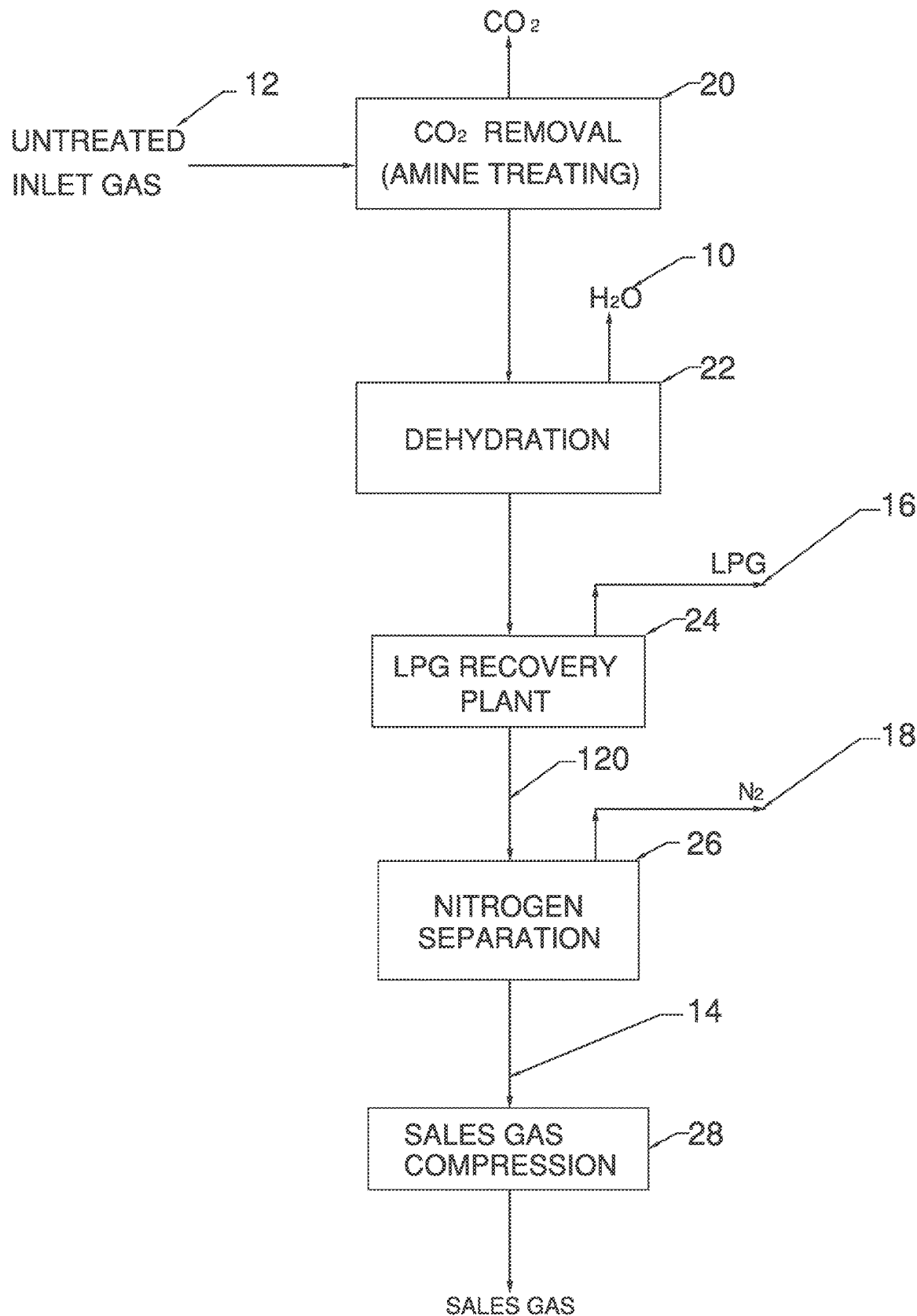
FIG. 1 is a block diagram of a convention gas processing system in which a nitrogen separation system according to one embodiment of the present disclosure is utilized.

The present disclosure provides efficient methods and related systems for separating nitrogen from a natural gas stream. The present disclosure is susceptible to embodiments of different forms. There are shown in the drawings, and herein will be described in detail, specific embodiments of the present disclosure with the understanding that the present disclosure is to be considered an exemplification of the principles of the present disclosure, and is not intended to limit the disclosure to that illustrated and described herein.

In aspects, the present disclosure provides an improved nitrogen separation system for the removal of the nitrogen component from a previously processed natural gas stream. For the purposes of the present disclosure, the terms such as "removal," "separation," and "rejection" refer to extracting nitrogen component from a fluid. The present disclosure provides an easily installed additional processing unit that can remove excess nitrogen that has passed through previous processing when that excess nitrogen is less that 25 mole % nitrogen. Thus, beneficially, a natural gas stream processed according to the present disclosure may achieve the specifications for nitrogen in the sales gas stream.

FIG. 1 schematically depicts a natural gas processing plant 10 that may incorporate a nitrogen separation system according to the present disclosure. In an illustrative operation, an untreated inlet gas 12 containing hydrocarbons, water, carbon dioxide and nitrogen is delivered to the gas processing plant 10. While the inlet gas 12 may often include natural gas and hydrocarbons that usually include the propane, ethane, and less volatile hydrocarbons, the inlet gas 12 may also be composed of other gases such as syngas. Since $CO_2$ is susceptible to freezing and rendering cryogenic systems inoperable, the untreated inlet gas 12 is first fed into an inlet gas treating unit 20 to remove $CO_2$. This is commonly accomplished with an amine treating unit. After removal of $CO_2$, the treated inlet gas must be dehydrated to less than one part per million of $H_2O$. This may be done using a dehydration unit 22, which may consist of a molecular sieve system. After removal $H_2O$, the treated inlet gas is processed to remove the heavier hydrocarbons from the natural gas. These hydrocarbons usually include propane and less volatile hydrocarbons as well as ethane, but may have other compositions. This process may be performed in an LPG recovery plant 24. This processing is typically the revenue generating step in the overall process.

Excess nitrogen in the untreated inlet gas 12 is generally removed since nitrogen will reduce the heating value of the sales gas. In accordance with the teachings of the present disclosure, a nitrogen separation system 26 may be used to remove sufficient nitrogen to allow the remaining gas, or sale gas 14, to meet pipeline specifications, typically less than 2% mole $N_2$.

Although not a necessary part of the processing system, it is common that the inlet gas has undergone significant pressure drop in the steps above and must be compressed to a pressure that permits flow into a sales gas pipeline. A conventional compression unit 28 may be used to compress the sales gas 14 to the desired pressure. It should be noted that one or more of these steps may be omitted, depending upon the composition of the gas or pretreatment that occurred elsewhere in the system.

Figure 2:
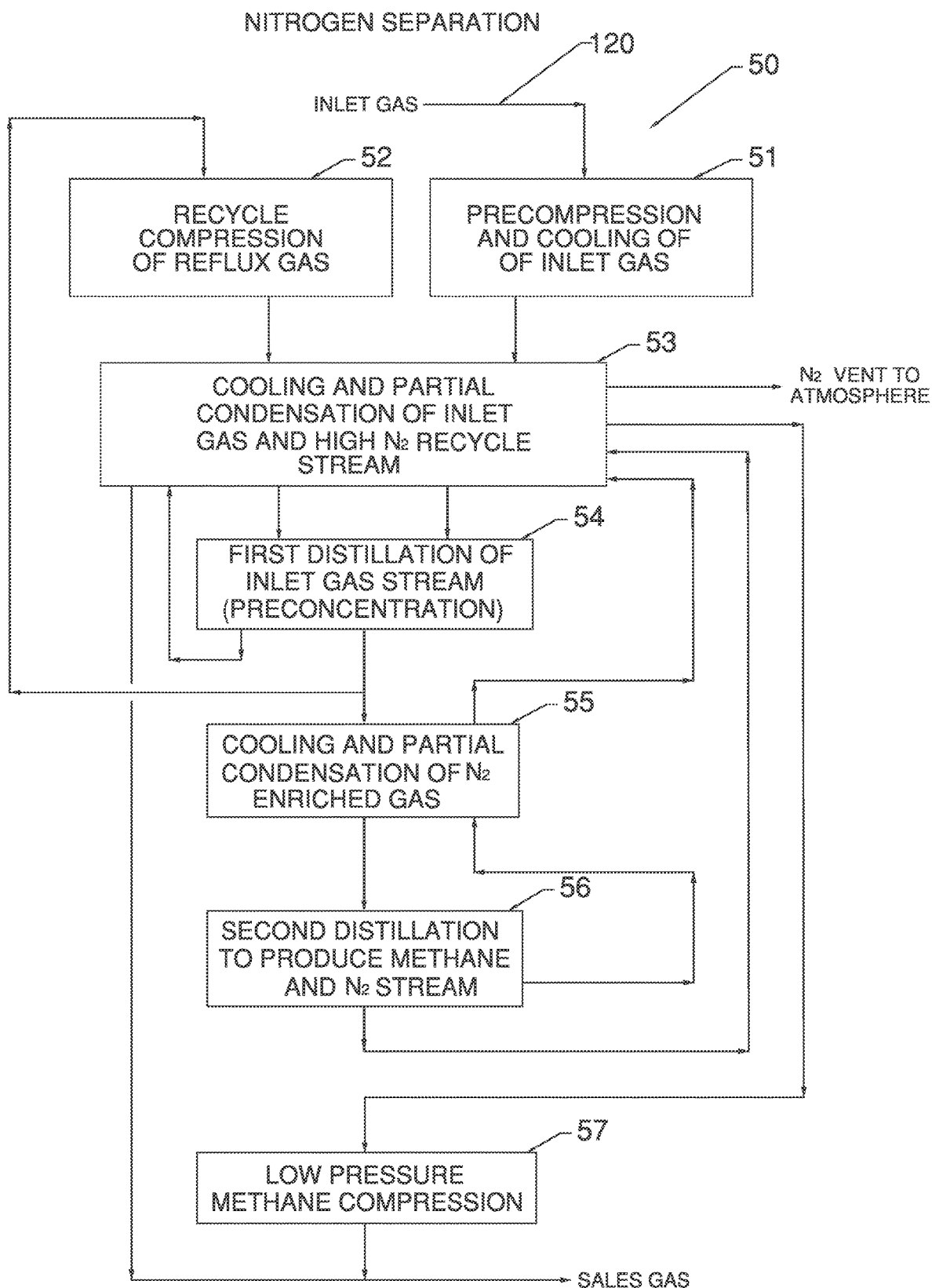
FIG. 2 illustrates a method for separating nitrogen from an inlet gas during gas processing in accordance with one embodiment of the present disclosure.

Referring to FIG. 2, there is shown a flow diagram illustrating one non-limiting embodiment of a method for removing excess nitrogen from an inlet gas using a nitrogen separation system 26 according to the present disclosure. The components and equipment of the nitrogen separation system 26 will be discussed in greater detail later in connection with FIG. 3.

Generally, the method 50 includes an inlet gas compression step 51, a first gas cooling and partial condensing step 53, a reflux compression step 52, a concentrating step 54, a second gas cooling and partial condensing step 55, a rejection step 56, and a methane compression step 57. As will described in greater detail below, nitrogen is separated from an inlet gas having less than 25 mole % nitrogen using a nitrogen separation system configured with cryogenic refrigeration.

In the inlet gas compression step 51, a compressor raises the pressure of the nitrogen containing inlet gas leaving a natural gas processing plant to between 300 psig and at least 400 psig depending upon the nitrogen concentration of the inlet gas and the required purity of the separation. If the inlet gas pressure is above 400 psig, this step may be eliminated. After compression, the compressed gas stream may be cooled to ambient temperature to remove the heat of compression using air or water.

In the partial condensing step 53, the compressed inlet gas leaving step 51 is cooled and partially condensed in a heat exchanger. The purpose of step 53 is to reduce the temperature of the compressed inlet gas to the cryogenic range for separation; i.e., below −150° F. The temperature of the compressed inlet gas after step 51 will be between −170° F. and −240° F., which is sufficient for at least partial condensation of the inlet gas stream.

In the concentrating step 54, the cooled and partially condensed inlet gas produced by step 53 is delivered to a distillation tower for separation into a nitrogen enriched vapor overhead stream and a methane enriched liquid bottoms stream. The distillation column operates at between 200 psig and 400 psig.

The function of the concentrating step 54 is to separate nitrogen from the cooled and partially condensed inlet gas. In the distillation column, a largely methane liquid stream travels downward and contacts in counter-current fashion the gas rising from a distillation tower reboiling stage. The term "largely," means at least a majority. This contact strips the nitrogen from the methane liquid stream. The distillation tower overheads consist of a natural gas stream which contains nearly all of the nitrogen found in the inlet gas. This distillation tower produces an overhead gas composition of between 30% and 60% nitrogen. However, the overhead gas still contains a significant quantity of methane which must be recovered.

Step 54 also requires a very cold reflux stream that is fed to a top tray of the distillation tower. The reflux stream can produce a high degree of nitrogen concentration in the overhead gas stream. This reflux stream is produced by first dividing the overhead stream formed by step 54, which is enriched in nitrogen, into two portions. A first portion, between 15% and 60% by volume, is referred as to the reflux stream. The reflux stream is warmed in cross exchange with warm inlet streams in the heat exchanger described in step 53.

In the reflux compression step 52, the reflux stream is compressed to between 500 psig and 1000 psig. After compression, the compressed overhead stream may be cooled to ambient temperature to remove the heat of compression using air or water. Thereafter, the compressed overhead stream is cooled in the heat exchanger described in connection with step 53. The cooled, compressed reflux stream is fed into the distillation tower as described in step 54.

In the second gas cooling and partial condensing step 55, the remaining portion of the enriched nitrogen overhead stream is further cooled and partially condensed.

The rejection step 56 is the final separation process of the system. This step may use any conventional nitrogen Recovery Unit (NRU). Step 56 separates the nitrogen and methane components and typically produces a very pure gaseous nitrogen stream and a largely liquid methane stream or streams. These streams are used to provide the cooling streams for the heat exchangers described above in connection with steps 55 and 53.

It should be noted that one or more above-recited steps may be omitted or performed in a different order or concurrently. Further, additional intervening steps may be performed in certain embodiments. The FIG. 2 nitrogen separation method 50 may be used in any number of system configurations and industrial applications.

Figure 3:
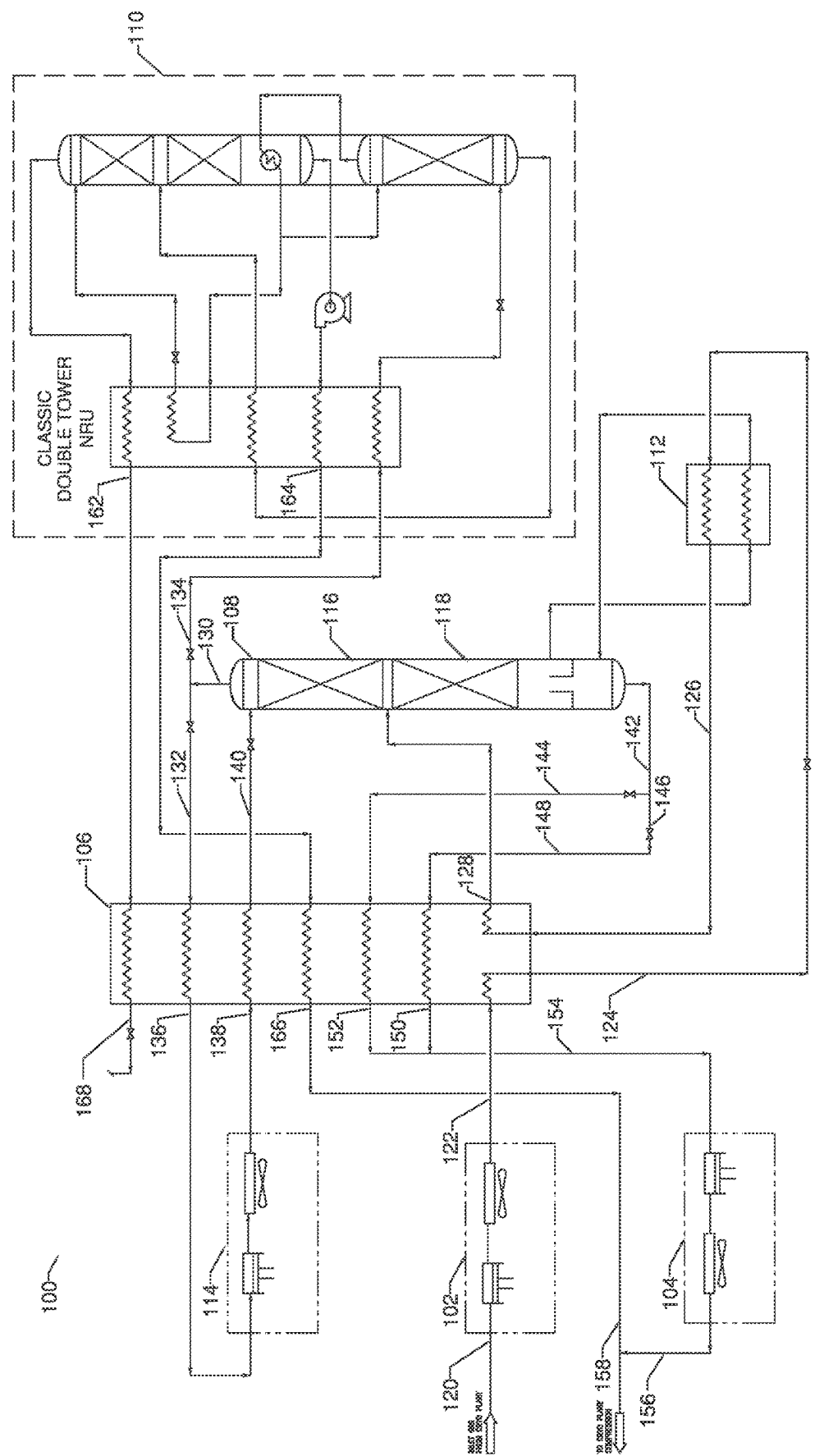
FIG. 3 schematically illustrates a natural gas processing system that uses a nitrogen separation system according to one embodiment of the present disclosure.

FIG. 3 illustrates one non-limiting embodiment of a system 100 for the separation of nitrogen from an inlet gas 120 from an LPG recovery plant according to the present disclosure. The inlet gas 120 may contain nitrogen in concentration greater than 2%, which is unsuitable for delivery to a commercial pipeline. The system 100 of FIG. 3 is configured to efficiently and cost effectively reduce the concentration of nitrogen from the inlet gas 120.

The inlet gas 120, if at a pressure less than 400 psig, may be compressed using a gas compressor 102 to a pressure of at least 400 psig. After compression, the inlet gas 120 is cooled to ambient temperature in a heat exchanger 106 using any cooling medium but typically air or water. The inlet gas 120 after compressing and cooling is labeled 122.

The cooled and compressed gas stream 122 is directed to a multiple pass heat exchanger 106. The heat exchanger 106 is configured to reduce the temperature of the inlet gas 120 to the cryogenic range; i.e., below −150° F. After cooling, the compressed inlet gas 120 will be between about −170° F. and −240° F. The heat exchanger may be a multi-pass exchanger, typically of the brazed aluminum type, that is configured for cryogenic service. The heat exchanger may be a single exchanger or multiple heat exchangers in series or in parallel. The heat exchanger 106 may configured such that one or more warm streams are cooled in cross exchange with one or more cold streams. The gas stream 122 is cooled in the heat exchanger 106 and exits as a cooled gas stream 124. The cooled gas stream 124 may be further cooled in a heat exchanger 112, which serves as a reboiler for a distillation tower 108 which will be further described below. The gas stream 124 exits the heat exchanger 112 as a further cooled and partially condensed stream 126. The stream 126 may be redirected to the heat exchanger 106 for further cooling or may be directly fed to the distillation tower 108. The stream 126 after cooling and exiting the heat exchanger 106 will be at least 50 mole percent liquid.

The primary separation of nitrogen from the mostly light hydrocarbon inlet gas stream takes place in the distillation tower 108. This is a cryogenic distillation that concentrates nitrogen in an overhead gas stream. The overhead gas stream has a significantly higher nitrogen concentration than the inlet gas 120. The distillation tower 108 also produces a bottom product with a nitrogen concentration which will be significantly lower than the inlet gas 120, typically with a molar nitrogen concentration of 0.5% and thereby suitable for delivery to the sales gas system.

The distillation tower 108 has two feed streams: a main feed stream 128 and a reflux stream 140. A main feed stream 128 is directed to the middle of the distillation tower 108 between a bottom stripping section 114 and a rectification section 116. The liquid portion of the distillation feed is stripped of nitrogen content in counter-current flow against the rising vapor from the reboiler 112. A portion of the hydrocarbon content of the vapor rising through the rectification section 116 condenses, thereby increasing the relative fraction of its nitrogen content. The nitrogen enriched vapor leaving the rectification section 116 is labeled as overhead stream 130. The reflux stream 140 is formed using the overhead stream 130 as discussed later.

The overhead stream 130 is divided into two streams 132 and 134. The stream 132 is warmed, compressed and returned to the distillation tower 108 as the reflux stream 140. The stream 134 is fed to a nitrogen rejection unit (NRU) 110 for final separation and purification of the inlet gas 120. The ratio of streams 132 and 134 is determined by the degree of nitrogen concentration desired. The percentage of the stream 132 may between 15% to 60%, inclusively, and the percentage of the stream 134 may be between 85% and 40%, inclusively.

The stream 132 is warmed in the heat exchanger 106 in counter flow with the warm streams feeding the heat exchanger 106 in order to recover as much of the refrigeration utility of the stream 132 as possible. The stream 132 will normally exit the heat exchanger 132 at near ambient temperature as stream 136.

The stream 136 feeds a reflux compressor 114 and is compressed to a pressure of between 500 psig and 1000 psig and then cooled, removing the heat of compression in an air cooled or water cooled heat exchanger 115 to ambient temperature. The compressed and cooled stream returns to the heat exchanger 106 as a stream 138. The stream 138 is cooled and largely condensed in the heat exchanger 106 and leaves as a stream 140. The degree of cooling of stream 138 will affect the performance of the distillation 108 to concentrate the overhead stream in its nitrogen content. Generally as this stream becomes colder the nitrogen content of stream 130 will increase. Another means of improving the nitrogen concentration in the overhead stream to increase the flow rate of stream 138 which is accomplished by increasing the ratio of the overhead split of streams 132 and 134. In a typical configuration stream 138 will be fully condensed as stream 140 at a pressure of 600 psig and a temperature of −195° F. and a composition of 50% nitrogen and 50% methane.

This rectification section 116 allows the distillation 108 to selectively condense additional methane from the vapor entering with the feed stream 128 and the vapor rising from the rectification section 118 while increasing the concentration of nitrogen from the feed stream.

The liquid hydrocarbon stream 142 that leaves the bottom of the distillation 108 will be at a pressure of between 300 psig and 500 psig. The stream 140 provides a substantial amount of the cooling required in the heat exchanger 106 for cooling the inlet gas 122. The boiling point of the stream 142 may not permit the entirety of the stream 142 to be vaporized at the high pressure at which it is delivered from the distillation 108. Therefore, a portion of the liquids in the stream 142 may be dropped in pressure such that its boiling point is reduced and some of the cooling is provided at a lower temperature.

The stream 142 may be divided into two streams, 144 and 146. The respective fraction of these streams depends upon the operating conditions of the plant but typically between 5% and 30% of the flow will be directed to the stream 146.

The stream 144 will then pass in counter-current flow through the heat exchanger 106 and provide cooling to the warm streams of the heat exchanger 106 at approximately the temperature of the inlet gas 120. The stream 144 will exit the heat exchanger 106 as a stream 152, which is fully vaporized and warmed back to ambient temperature.

The stream 146 will flow through a pressure reduction valve 147 and partially vaporize and cool to a lower temperature than the stream 142. The stream 148 will then pass in counter-current flow through the heat exchanger 106 and vaporize at a lower temperature than the stream 144. The stream 148 will exit the heat exchanger 106 as a stream 150, which is fully vaporized and warmed back to ambient temperature. By dividing the stream 142 into two streams 144 and 146 and vaporizing one of them at a lower pressure, it is possible to recover all of the heat of vaporization of the cryogenic liquid stream 142.

The stream 150 will typically be delivered at a pressure of between 100 psig and 200 psig. The stream 150 will then be conjoined with a hydrocarbon stream 166 that originates from the NRU 110, which is delivered at this same lower pressure. A combined stream 154 is delivered to a low pressure methane compressor 104 and compressed and cooled to become stream 156. The discharge pressure of the low pressure methane compressor 104 is sufficient to join the stream 156 with the stream 152 to form the stream 158. It should noted that the stream 158 is delivered at a pressure between that of inlet gas 120 before the inlet compressor 102 and the stream 122 after the inlet compressor 102.

The NRU 110 may utilize any of several processes and is illustrated here as a general cryogenic separation unit. Some arrangements may use a double-tower heat integrated unit. The present disclosure is not limited to any particular NRU design. These units will require at least a 25 molar % nitrogen content in the feed stream and will be able to produce a nitrogen stream at near atmospheric pressure of less than 1% hydrocarbon, and a hydrocarbon stream of less than 2% nitrogen. The NRU 100 produces at least two cold streams: a gaseous nitrogen stream 162 and a largely liquid methane stream 164. The nitrogen stream 162 and the methane stream 164 are heated in counter-current cross exchange in the heat exchanger 106 to ambient temperature. The methane stream 164 will return at a pressure greater than the pressure of previously described stream 150 and exit the heat exchanger 106 as a stream 166. As previously described above, the stream 166 joins stream 150.

From the above, it should be appreciated that a nitrogen separation method according to one embodiment of the present disclosure includes the steps of: if required, compressing an inlet gas to at least 400 psig; cooling and partially condensing the inlet gas in a heat exchanger; delivering the cold and partially condensed inlet gas a distillation tower; and concentrating nitrogen in an overhead stream to a level of between 30% or greater nitrogen while producing a bottom stream that is largely stripped of nitrogen. The method may further include dividing the overhead stream into two portions. One portion is reheated, compressed to a pressure equal to or greater than the inlet gas pressure, cooled, largely condensed, and fed into the distillation tower as a reflux stream. The other portion is further chilled and sent to an NRU.

It should be noted that in other embodiments one or more above-recited steps may be omitted or performed in a different order or concurrently. Further, additional intervening steps may be performed in certain embodiments.

From the above, it should also be appreciated that the present disclosure provides a stand-alone nitrogen separation unit intended to be an add-on, sequential unit to a natural gas liquid recovery unit capable of processing gas with a range of nitrogen composition from as little as 3% to as much as 50%. The methods and systems according to the present disclosure can produce a very pure nitrogen vent stream with less than 0.1% methane thereby recovering virtually all of the valuable methane gas while also producing a hydrocarbon stream with less than 1% nitrogen. The growing recognition of methane as a deleterious greenhouse gas adds greater importance to the ability of the invention to produce extremely low nitrogen concentrations in the vented gas.

The foregoing description is directed to particular embodiments of the present disclosure for the purpose of illustration and explanation. It will be apparent, however, to one skilled in the art that many modifications and changes to the embodiment set forth above are possible without departing from the scope of the disclosure. Thus, it is intended that the following claims be interpreted to embrace all such modifications and changes. The growing recognition that methane is an environmentally deleterious greenhouse gas further illustrates the advantages and benefits of the present teachings, and particularly the teachings of natural gas nitrogen separation systems that produce extremely low nitrogen concentrations in the vented gas.

I claim:

1. A method for separating nitrogen from an inlet gas produced at a natural gas processing plant, comprising:
    receiving the inlet gas at a natural gas processing system wherein the inlet gas has less than 25 mole % nitrogen and has been previously processed to remove at least propane and less volatile hydrocarbons;
    concentrating the nitrogen in the inlet gas in an overhead stream of a distillation tower;
    dividing the overhead stream into a first portion and a second portion;
    sending only the second portion to a nitrogen rejection unit; and
    distilling the nitrogen from the overhead stream using the nitrogen rejection unit.

2. A method for separating nitrogen from an inlet gas produced at a natural gas processing plant, comprising:
    receiving the inlet gas at a natural gas processing system, wherein the inlet gas has less than 25 mole % nitrogen and has been previously processed to remove at least propane and less volatile hydrocarbons;
    concentrating the nitrogen in the treated inlet gas in an overhead stream of a distillation tower;
    dividing the overhead stream into a first portion and a second portion to obtain a desired nitrogen concentration in the overhead stream, wherein the first portion is between 15% and 60% of the overhead stream and the second portion is between 85% and 40% of the overhead stream; and
    feeding the second portion to the nitrogen rejection unit.

3. The method of claim 2, further comprising:
    compressing and cooling the first portion to produce a reflux stream.

4. The method of claim 3, further comprising:
    feeding the reflux stream to the distillation tower.

5. The method of claim 1, wherein the distillation tower produces a liquid bottoms stream, and further comprising:
    dividing the liquid bottoms into a first stream and a second stream;
    vaporizing the first stream and the second stream in a heat exchanger; and
    combining the first stream and the second stream.

6. A method of separating nitrogen from an inlet gas stream produced at a natural gas processing plant, the method comprising:
    receiving the inlet gas stream at a natural gas processing system, wherein the inlet gas stream has less than 25 mole % nitrogen and has been previously processed to remove at least propane and less volatile hydrocarbons;
    at least partially condensing the inlet gas stream to form an at least partially condensed inlet stream;
    processing the at least partially condensed inlet stream in a distillation tower to form an overhead gas stream and a liquid bottoms stream;
    concentrating nitrogen in an overhead stream to a level of between 30% or greater nitrogen;
    dividing the overhead gas stream into a first portion and a second portion to obtain a desired nitrogen concentration in the overhead stream, wherein the first portion is between 15% and 60% of the overhead gas stream and the second portion is between 85% and 40% of the overhead gas stream;
    heating the first portion using at least the treated inlet gas being received;
    compressing the heated first portion to a pressure at least 100 PSI higher than an operating pressure of the distillation tower;
    at least partially condensing the compressed heated first portion to form a reflux stream;
    feeding the reflux stream to the distillation tower at a location above a rectification section of the distillation tower;
    feeding the second portion to a nitrogen rejection unit, the nitrogen rejection unit producing a cold nitrogen rich stream and at least one cold methane rich stream;
    heating the at least one cold methane stream using at least the inlet gas stream.

* * * * *